G. R. CRAW.
KITCHENETTE.
APPLICATION FILED NOV. 20, 1916.
1,258,655.
Patented Mar. 12, 1918.
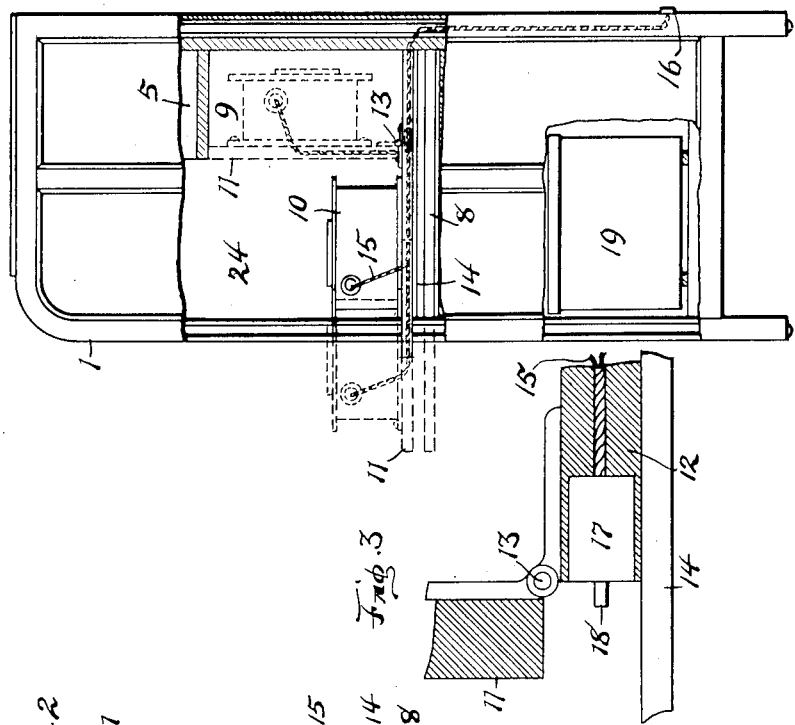
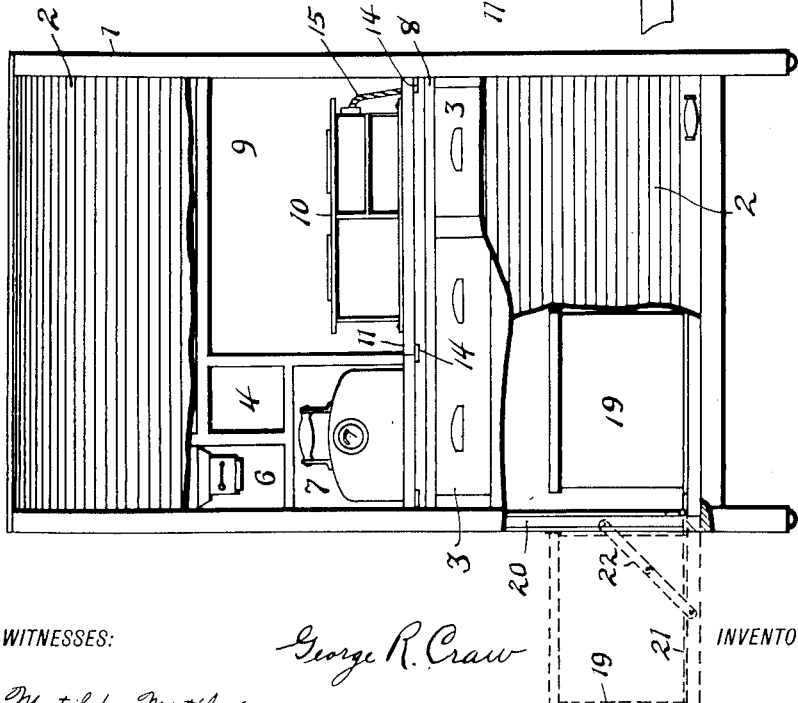
WITNESSES:
Matilda Mettler
Sophia Heine
George R. Craw INVENTOR
BY
A. G. Burns
ATTORNEY

UNITED STATES PATENT OFFICE.

GEORGE R. CRAW, OF FORT WAYNE, INDIANA.

KITCHENETTE.

1,258,655.  Specification of Letters Patent.  Patented Mar. 12, 1918.

Application filed November 20, 1916. Serial No. 132,275.

*To all whom it may concern:*

Be it known that I, GEORGE R. CRAW, a citizen of the United States of America, and resident of Fort Wayne, in the county of Allen and State of Indiana, have invented certain new and useful Improvements in Kitchenettes, of which the following is a specification.

This invention relates to improvements in kitchenettes and the object of the improvement is to afford a portable inclosed kitchenette provided with the usual compartments and receptacles for storing food and culinary utensils and also a disappearing stove, the principal object being to secure a large range of utility from apparatus contained compactly within a comparatively small inclosure. The device is especially intended for use in light housekeeping operations, and is especially useful for those small families who move frequently from place to place, and those who occupy restricted quarters, the purpose being to conceal the nature of the device.

The objects of the invention are accomplished by the construction illustrated in the accompanying drawings in which:—

Figure 1 is a front elevation of the invention showing a portion thereof cut away and with the stove in operating position;

Fig. 2 is a view of Fig. 1 in a plane at right angles thereto showing also parts broken away and in section; and Fig. 3 is a detail view, partially in section showing the switch for making and breaking the electrical circuit that energizes the stove.

Similar characters of reference indicate corresponding parts throughout the several views and referring now to the same:—

1 is a cabinet, the front of which is provided with a roll curtain (2) for closing the same. The interior of the cabinet is provided with drawers (3), various compartments (4), (5), (6) and (7) for the reception of cooking materials, containers, utensils, etc., such as are ordinarily stored in kitchen cabinets. A sliding shelf (8) is also arranged within the cabinet, which is adapted to be moved outwardly beyond the front of the cabinet when the curtain has been raised, and serve as a table or work-bench.

A compartment (9) is also provided within the cabinet, in the rear portion thereof and is intended for the storage of a stove (10) when not in use. The stove is mounted upon a pan or platform (11) which is connected with a slide (12) by means of hinges (13). The slide and platform rest upon guides (14) in the cabinet when the platform is swung into its operating position and may be moved forwardly thereon so that the platform will project somewhat beyond the front of the cabinet. When the slide (12) with the platform attached thereto is moved to its rearmost position, the platform is adapted to be turned upon its hinges to a vertical position and close the compartment (9), the stove mounted upon the platform being then contained within the compartment. Electrical conductors (15) have connection with the stove and lead to a suitable terminal (16) with which proper connections may be made with a suitable source of electrical energy. One of said conductors has also connection with a switch (17) located in the slide (12) with its stem (18) projecting from the front edge thereof so that when the platform (11) is swung to its horizontal position, its rear edge will bear against the stem and thereby operate the switch. The switch may be of any well known type adapted to close an electrical circuit by applying pressure to the stem. The idea is to close the circuit when the stove is in operating position so that it will become energized, and to open the circuit when the stove is returned to its compartment. In the lower portion of the cabinet is provided an ice-box (19) that is accessible when the curtain (2) is raised. Or, a door (20) in the adjacent end of the cabinet may be provided and hinged so as to be swung into horizontal position as indicated by the dotted lines (21) and braced as indicated by the dotted lines (22), so that the door will form a shelf upon which the ice-box (19) may rest.

In using the device thus constructed, the stove may be readily brought into position for use by merely swinging the platform down on its guides, the electrical current being turned on in the operation. When the stove is no longer needed, it may be made to disappear into its compartment by turning the platform back to closed position. When the stove is thus disposed of, the space (24) in front of the closed platform is available for other purposes such as operations that may be performed upon the shelf (8).

What I claim is:—

In apparatus of the class described, a cabinet having a compartment for a stove;

means for closing the front of the cabinet; a platform hinged within the cabinet and adapted to close said compartment; a stove mounted upon the platform and adapted to be contained within the compartment when the platform is in closed position; and means controllable by changing the position of the platform for supplying energy to the stove, said platform when in open position being adapted to interfere with the closing of said closing means.

In testimony whereof I affix my signature, in presence of two witnesses.

GEORGE R. CRAW.

Witnesses:
MATILDA METTLER,
SOPHIA HEINE.